Aug. 4, 1970     E. H. SHAFF     3,522,697

DEVICE FOR PICKING FRUIT

Filed March 25, 1968     3 Sheets-Sheet 1

INVENTOR.
ERNEST H. SHAFF
BY THELMA MARGUERITE SHAFF
EXECUTRIX

Woodhams, Blanchard and Flynn
ATTORNEYS

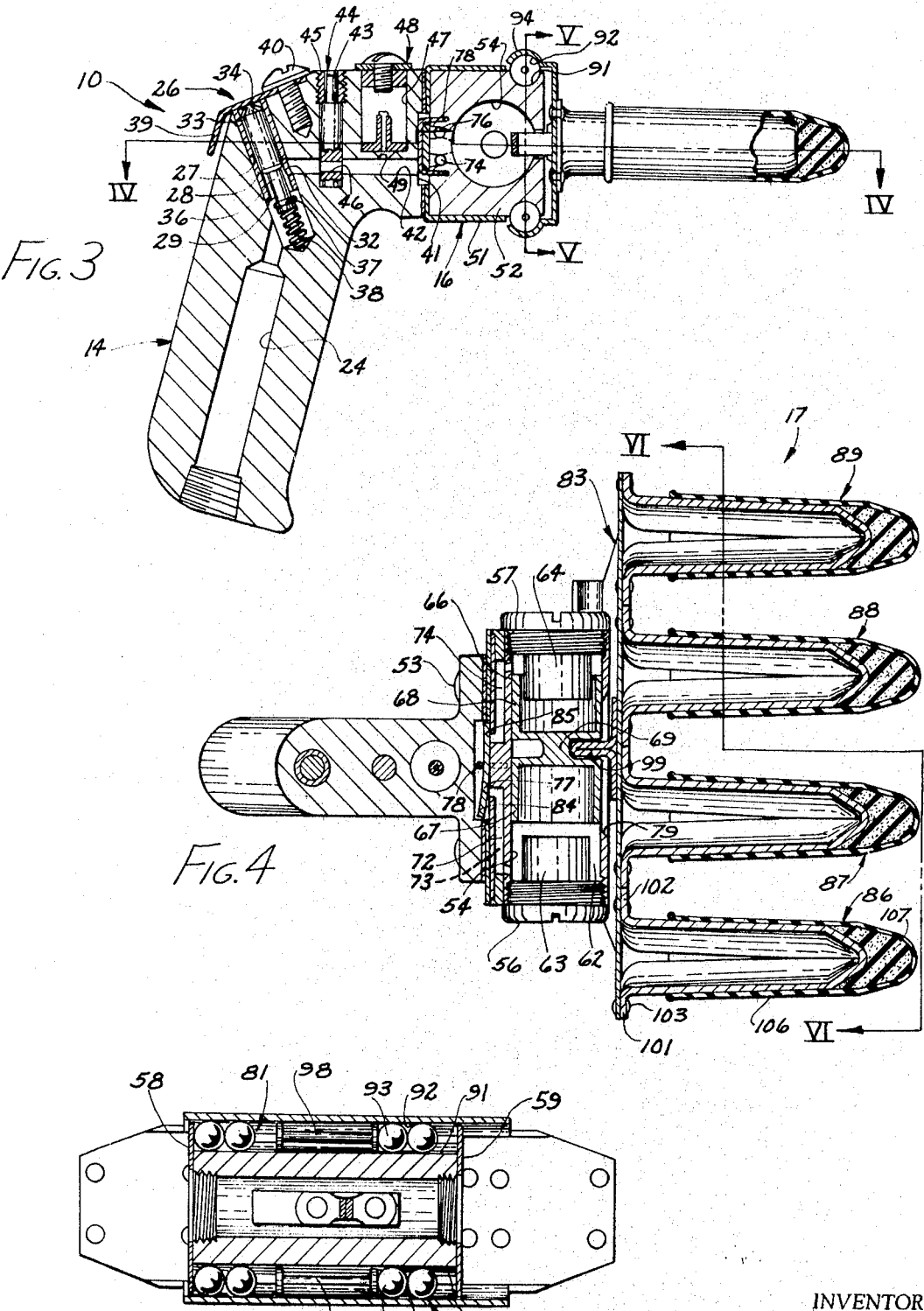

Aug. 4, 1970    E. H. SHAFF    3,522,697
DEVICE FOR PICKING FRUIT
Filed March 25, 1968    3 Sheets-Sheet 3
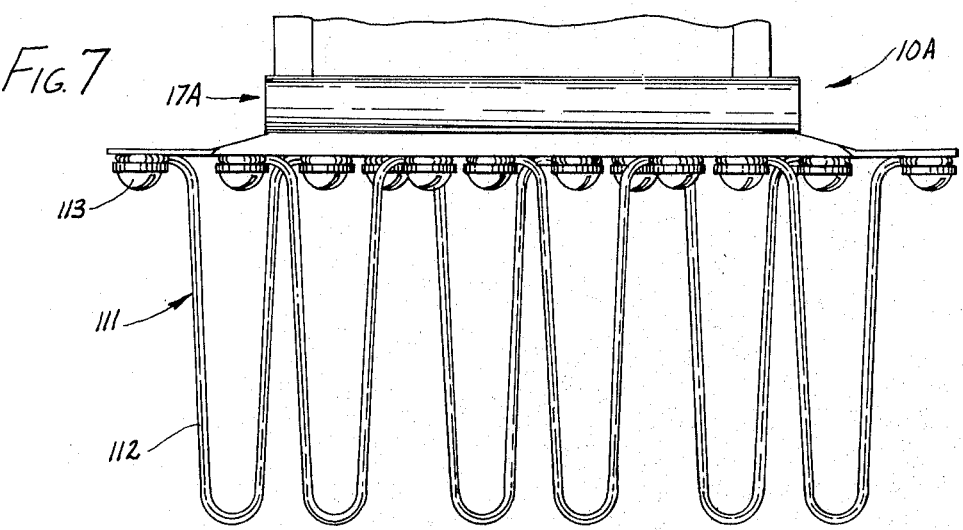
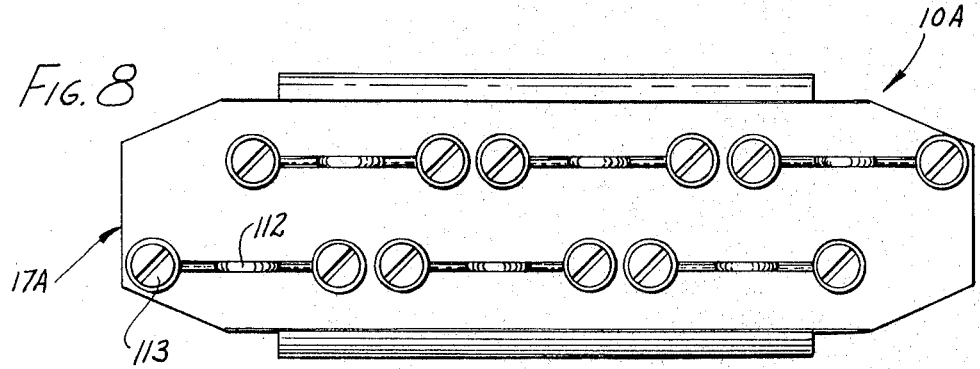
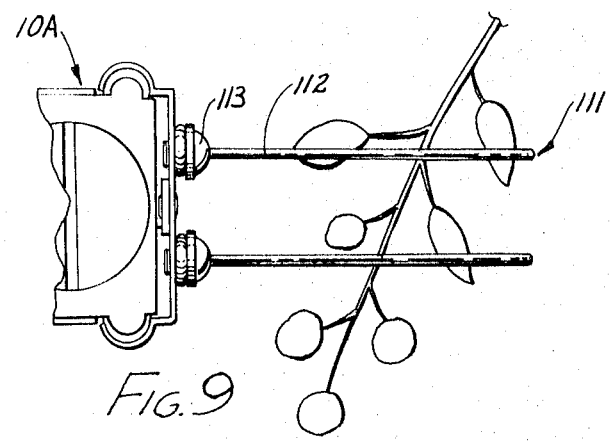
INVENTOR.
ERNEST H. SHAFF
BY THELMA MARGUERITE SHAFF
EXECUTRIX
Woodhams, Blanchard & Flynn
ATTORNEYS

United States Patent Office 3,522,697
Patented Aug. 4, 1970

3,522,697
DEVICE FOR PICKING FRUIT
Ernest H. Shaff, deceased, late of Lake Worth, Fla., by Thelma Marguerite Shaff, executrix, 820 S. A St., Lake Worth, Fla. 34460
Filed Mar. 25, 1968, Ser. No. 715,943
Int. Cl. A01g 19/00
U.S. Cl. 56—330    10 Claims

ABSTRACT OF THE DISCLOSURE

A berry-picking device having a handgrip supporting a motor which provides reciprocable driving power to a finger assembly which includes a pluarlity of elongated resilient fingers engagable with the branches and foliage of a berry bush.

BACKGROUND OF THE INVENTION

This invention relates in general to an improvement in fruit-picking equipment and, more particularly relates to a pneumatically powered, reciprocating berry picker which may be hand held and hand operated.

Persons familiar with small fruit husbandry, such as the raising and harvesting of blueberries, have long been aware of the need for automation in such industry. For many years, blueberries have been picked entirely by hand using itinerant laborers who would move into the fruit belt for the duration of the harvest season and would then move on to other seasonal work. Due to rising wages required by such laborers and due to the shortage of such laborers in recent years, the agriculturist has found it necessary to seek ways for increasing substantially the harvesting volume per man hour worked.

Previous attempts have been made to provide powered picking equipment. However, such proposed equipment has for one reason or another not been completely satisfactory. For example, some of the existing pickers are very large, weighing hundreds of pounds and, therefore, expensive to purchase and maintain. Thus, it is not practical to use them in any but the largest farming or harvesting operations. Also such equipment is much too complex to be operated by the normal laboring force available to the fruit agriculturist and also much too large fro use by the women and children who provide much of this labor force. Moreover, it cannot be maneuvered between the bushes on many berry farms.

Smaller hand-operated picking devices have also been proposed and although these devices may be more desirable in the normal farming operation than the very large picker yet they have had certain disadvantages. For example, many such picking devices tend to remove all of the berriers, failing to discriminate between ripe and unripe berries. Thus, these picking devices work well in the latter part of the harvest season when all of the remaining berries are ripe, but they are not satisfactory for use earlier in the season.

Accordingly, a primary object of the invention is to provide a power-driven, mechanical berry-picking device which is capable of adjustment and which vibrates the limbs of the berry bushes thereby selectively causing the ripe berries to fall while leaving the unripe berries.

Another object of this invention is the provision of a power-driven, mechanical berry-picking device, as aforesaid, which is small in size and simple enough to be hand held and manually operated by the usual farm laborer whether such laborer be a man, woman or child, and which can be operated after only a minimal amount of instructions.

Other objects and purposes of this invention will become apparent to persons familiar with the harvesting of berries or similar fruit upon reading the following descriptive material and examining the accompanying drawings, in which:

FIG. 3 is a sectional view of the device taken along the line III—III in FIG. 2.

FIG. 4 is a sectional view of the device taken along the line IV—IV in FIG. 3.

FIG. 5 is a sectional view taken along the line V—V in FIG. 3.

FIG. 7 is a fragmentary, top view of an alternate embodiment of the berry-picking device.

FIG. 8 is a front view of the alternate embodiment shown in FIG. 7.

FIG. 9 is a fragmentary, side view of the alternate embodiment shown in FIG. 7.

Figure 1:
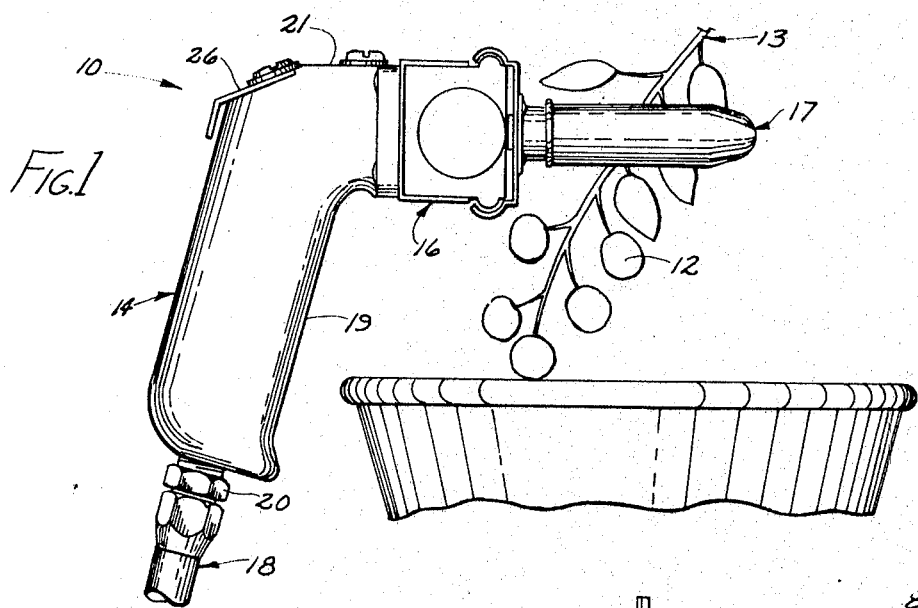
FIG. 1 is a side elevational view of the berry-picking device of the present invention in a position of operation.

For convenience in description, the terms "upper," "lower," "front," "rear" and words of similar import will have reference to the device of the invention as appearing in FIG. 1 wherein the front end of the device is at the right side of the figure. The terms "inner," "outer" and derivatives thereof will have reference to the geometric center of the device and parts thereof.

SUMMARY OF THE INVENTION

The objects and purposes of the invention, including those set forth above, have been met by providing a berry-picking device having a fluid-driven motor capable of imparting reciprocable movement to a finger assembly including a plurality of elongated fingers. Each of the fingers provide resilient means for shaking and brushing berries from the bushes. The device also has handgrip means by which the operator holds and controls the device during operation.

DETAILED DESCRIPTION

Figure 2:
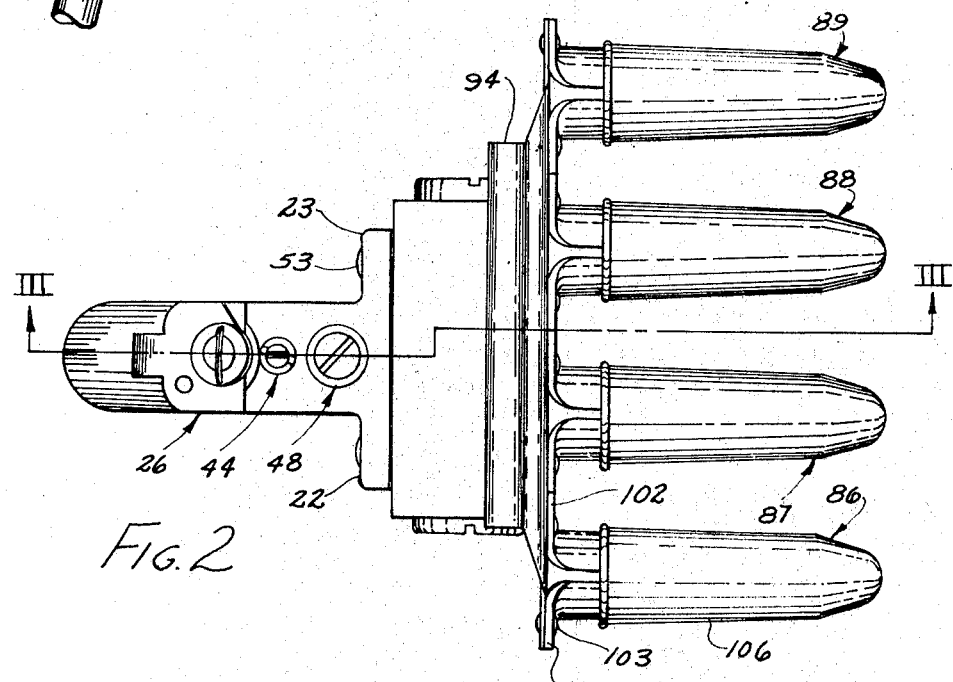
FIG. 2 is a top view of said device.
Figure 6:
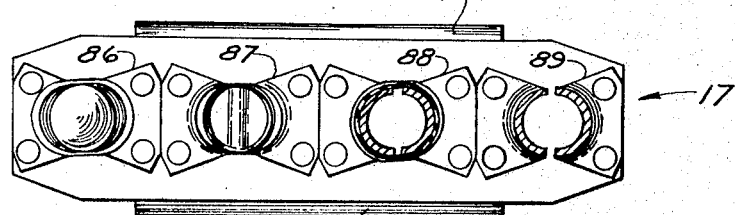
FIG. 6 is a sectional view taken along the line VI—VI in FIG. 4.

The device 10 (FIGS. 1 and 2) for picking berries 12 from bushes 13 includes a base 14, a motor 16 and a finger assembly 17. The picking device 10 is connected by the conduit 18 to a source (not shown) of pressurized fluid such as air.

The base 14 has a pistol-grip handle 19 and an integral upper portion 21 including a pair of sidewardly extending flanges 22 and 23. The grip 19 (FIG. 3) has an inlet passageway 24, the lower end of which is threaded for reception of a coupling 20 connected to the conduit 18. The upper end of the passageway 24 communicates with a chamber 27 containing an on-off valve 26.

The upper end of the chamber 27 contains a cylindrical sleeve 28 which opens downwardly, thereby providing a valve seat 29 at its lower end, and has a forwardly facing opening 32 spaced from the valve seat 29. The valve 26 has a valve rod 33 with an upper cylindrical portion 34 which is snugly but slideably received within the sleeve 28. The valve rod 33 has a lower portion 36 of reduced diameter which carries a valve head 37 engageable with the seat 29. A spring 38 is held under compression between the lower side of the valve head 37 and the lower end of chamber 27, whereby the valve head 37 is resiliently urged upwardly toward seat 29.

An actuating member 39 is pivotally held by screw 40 upon the upper end of base 14 for controlling the operation of valve 26. That is, when member 39 covers the chamber 27, it depresses the valve rod 33 downwardly into its lowermost operating position, thereby disengaging the valve head 37 from valve seat 29. The lower, reduced portion 36 of valve rod 33 is of sufficient axial length that, when it is in its lowermost or open position, the upper cylindrical portion 34 does not obstruct the opening 32 in sleeve 28.

The valve 26 may be closed by pivoting the actuating member 39 sidewardly away from the valve rod 33, thus allowing spring 38 to move valve rod 33 upwardly until valve head 37 sealingly engages valve seat 29. The upper end of rod 33 is sloped so that the portion thereof extending above the base 14 can be slideably engaged by the member 39 to depress the rod 33.

The upper portion 21 of base 14 has a recess 41 at its forward end and a passageway 42 extending from opening 32 in sleeve 28 to the recess 41. The upper portion 21 also has an upright opening 43 which is transverse to and extends through passageway 42. A volume control valve 44 is rotatably held in opening 43 by the threaded sleeve 45 and said valve has a diametrical opening 46 which may be adjusted into and out of communication with passageway 42 by rotating the valve 44, thereby varying the volume of fluid passing through the passageway 42. The valve 44 has a slot at its upper end for engagement by a screwdriver to effect such adjustment.

The upper portion 21 has an opening 47 for reception of a lubricating device 48 which releases small amounts of a conventional lubricant through opening 49 into the fluid passageway 42. The airstream then carries the lubricant into motor 16.

The motor 16 (FIGS. 3 and 4), which is pneumatically powered, has a casing 51 containing a motor block 52. The casing 51 and block 52 are secured to the flanges 22 and 23 of base 14 by bolts 53. The motor block 52 may be constructed from a piece of rectangular metal stock and has a cylindrical opening 54 extending therethrough transversely of the handgrip 19.

The cylindrical opening 54 is threaded at both ends for reception of screws 56 and 57 which enclose the ends of opening 54, thereby providing a chamber 62. The screws 56 and 57, which also retain the casing end plates 58 and 59, have portions 63 and 64, respectively, of reduced diameter which extend into the chamber 62.

A double-acting piston 66 is snugly disposed in chamber 62 and has a pair of spaced cup-shaped end portions 67 and 68 opening away from each other and interconnected by a neck portion 69. The inner diameters of portions 67 and 68 are of sufficient size to allow loose entrance therein of portions 63 and 64 of screws 56 and 57, respectively.

The motor 16 has a first pair of air passageways 72 and 73 (passageway 73 being disposed directly above passageway 72) which extend through block 52 between the recess 41 in base 14 and chamber 62 adjacent end screw 56. The motor block 52 has a second pair of passageways 74 and 76 which extend from the recess 41 to chamber 62 adjacent end screw 57.

The motor 16 has a rocker valve 77 disposed within the recess 41 and loosely attached to the block 52 by pin 78. The rocker valve 77 is rectangular and slightly arcuate-shaped in horizontal cross section with the first portion 84 being disposed at an angle of approximately 10 degrees with respect to the plane defined by the second portion 85. The valve 77 is thus capable of rocking motion whereby either the passageways 72 and 73 or the passageways 74 and 76 are alternatingly closed. The motor block 52 also has an elongated exhaust port 79 which opens forwardly.

The finger assembly 17 (FIGS. 3, 4 and 5) is mounted forwardly of the motor 16 on bearings 81 and 82. The finger assembly 17 includes a channel-shaped support member 83 to which are secured a plurality of fingers 86, 87, 88 and 89. The bearings 81 and 82 may be identical and, therefore, only bearing 81 is described in detail. The bearing 81 has an inner race or groove 91 in the motor block 52 and an outer race or groove 92 defined by the rearwardly extending flange 94 of support member 83. A plurality of steel balls 93 are disposed between said inner race 91 and said outer race 92 and are retained at the opposite ends of the race 91 by the end plates 58 and 59. A spacer 98 is slideably disposed between the plates 58 and 59 to separate the balls 93 into two spaced groups. The bearing 82 has balls 93A disposed between groove 91A and flange 92A, and separated by a spacer 98A.

A central flange 99 is rigidly secured to the member 83 and extends rearwardly through exhaust port 79 in the motor block 52 and is drivingly engaged between the spaced end portions 67 and 68 of piston 66.

The fingers 86, 87, 88 and 89 may be identical and, therefore, only the finger 86 is described in detail. Finger 86 is substantially frusto-conical in shape and may be press formed from sheet material, such as sheet metal. Finger 86 has a pair of integral flanges 101 and 102 at its base by which it is secured to member 83, as with rivets 103. Each of the fingers, such as finger 86, has a resilient sleeve 106 mounted thereover. The sleeve 106 may be comprised of natural or artificial rubber material and has a soft, sponge-like material 107 disposed in the forward end thereof.

OPERATION

Although the operation of the structure embodying the invention will be apparent to skilled persons from the foregoing description, a summary thereof will now be set forth.

The berry-picking device 10 (FIG. 1) is first connected by conduit 18 to a suitable source of pressurized air. The picking device 10 is gripped in the hand of the operator and turned on by sideward movement of the actuating member 39 into its FIG. 2 position. The actuating member 39 thereby depresses the valve rod 33 to unseat the valve head 37 and permit air to pass from conduit 18 through inlet passageway 24, valve 26 and passageway 42 into the rocker valve recess 62. With the rocker valve 77 in the position shown in FIG. 4, air passes around the end of portion 84 and through passageways 72 and 73 into the rightward end of chamber 62 (at lower end of FIG. 4), thereby forcing piston 66 leftwardly until the pressurized air can escape through port 79 in motor block 52. The valve 77 then rocks and closes passageways 72 and 73 and opens passageways 74 and 76. Air is then passed through passageways 74 and 76 into the leftward end of chamber 62 forcing piston 66 rightwardly until the pressurized air can escape through port 79. The piston is thus caused to reciprocate rapidly and through the driving engagement with the flange 98 reciprocates the finger assembly 17 lengthwise of the block 52.

The device 10 while so operating is moved along or held against the branches 13 containing berries 12. The fingers 86, 87, 88 and 89 engage the sides of the branches 13 and shake the ripe berries 12 from the branches 13 into the container 108.

If the finger assembly 17 is reciprocating too rapidly and thereby shaking unripe berries from the bushes 13, or if the finger assembly 17 is reciprocating too slowly and therefore leaving some ripe berries on the bushes, proper adjustment can be made by rotating the valve 44 as needed to move the opening 46 into greater or lesser communication with the passageway 42, thereby permitting a greater amount or a lesser amount of air to pass to the motor 16.

ALTERNATE CONSTRUCTION

The device 10A (FIG. 7) is in general similar in structure to the device 10 with the exception of the finger assembly 17A. In this embodiment, the fingers 111 are comprised of U-shaped wire members 112 which are attached to member 83A by screws 113. The wire members 112 are preferably constructed of resilient material, such as spring steel, which can be easily flexed without permanent deformation. In this embodiment, two rows of fingers 111 are provided. However, more or fewer rows could be provided as desired.

Operation of device 10A may be substantially identical to the operation of device 10 described above.

Although particular preferred embodiments of the invention have been disclosed above for illustrative purposes, it will be understood that variations or modifications of such disclosure, which lie within the scope of the appended claims, are fully contemplated.

The embodiments of the invention in which an exclusive property or privilege is claimed are defined as follows:

1. A fruit-picking device, comprising:
   base means having a handle;
   a pressure-fluid actuated motor means mounted upon said base means;
   a finger assembly having a plurality of spaced, substantially parallel, coplanar and coextensive fingers, said assembly being drivingly engaged by said motor means, said fingers being reciprocated by said motor means within said plane;
   said pressure-fluid actuated motor means including a motor housing connected to the base means and defining a chamber therein and a motor member movably disposed within the chamber, and passageway means communicating with said chamber for supplying pressurized fluid thereto for driving said motor member; and
   control means associated with said motor means for adjusting the rate of reciprocation of said finger assembly.

2. The device defined in claim 1, wherein each said finger has a thin-walled, frusto-conical inner shell substantially covered by a resilient and elongated cup; and
   wherein a resilient packing material is disposed within the end of each of said cups.

3. The device defined in claim 1, wherein said assembly includes an elongated support member and each finger comprises a flexible U-shaped wire member mounted on said support member.

4. The device defined in claim 1, wherein said handle comprises a pistol grip disposed transverse to said support member; and
   wherein said control means is mounted upon said base means for operation by the thumb of a hand gripping said grip.

5. The device defined in claim 1, including a source of pressurized air and wherein said motor housing comprises a block having an elongated cylindrical chamber therein;
   said motor member comprising a piston disposed for reciprocation within said elongated chamber;
   said passageway means including an inlet passageway, first passage means extending from said inlet passageway to a point near one end of said elongated chamber, and second passage means extending from said inlet passageway to a point near the other end of said elongated chamber; and
   said motor means further including valve means in said inlet passageway adapted to alternately close said first passage means and said second passage means, and exhaust passage means connected to said elongated chamber.

6. The device as defined in claim 5, wherein said finger assembly includes flange means extending through said exhaust passage means and drivingly engaging said piston.

7. The device as defined in claim 5, wherein the valve means includes a first control valve in said inlet passageway and manually operable to open and close said inlet passageway; and
   wherein said control means includes a second control valve for adjusting the fluid flow through said inlet passageway when said control valve is open.

8. The device defined in claim 1, wherein said control means includes valve means coacting with said passageway means and manually operable for opening and closing said passageway means and for adjusting the fluid flow therethrough when the passageway means is open.

9. The device defined in claim 1, wherein the motor member comprises a piston positioned for reciprocable movement within said chamber, said piston including a pair of cup-shaped end portions fixedly interconnected and opening outwardly away from each other, and a central portion of said piston being fixedly interconnected to said finger assembly for causing reciprocation thereof.

10. The device defined in claim 1, wherein the motor housing has a pair of spaced, parallel guide surfaces formed thereon, and said finger assembly including a flange member also having a pair of guide surfaces formed thereon and positioned opposite the respective guide surfaces on the motor housing, and a plurality of balls disposed between the associated guide surfaces formed on the motor housing and the flange for permitting reciprocation of the finger assembly.

References Cited

UNITED STATES PATENTS

| | | | |
|---|---|---|---|
| 2,544,443 | 3/1951 | Brateng | 56—330 |
| 3,023,565 | 3/1962 | McKibben et al. | 56—330 |
| 3,427,796 | 2/1969 | McCray et al. | 56—328 |

RUSSELL R. KINSEY, Primary Examiner